(12) United States Patent
Igashira et al.

(10) Patent No.: US 8,015,435 B2
(45) Date of Patent: Sep. 6, 2011

(54) DATA WRITING METHOD

(75) Inventors: Atsushi Igashira, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 12/369,389

(22) Filed: Feb. 11, 2009

(65) Prior Publication Data
US 2009/0235114 A1   Sep. 17, 2009

(30) Foreign Application Priority Data
Mar. 13, 2008 (JP) .................................. 2008-063973

(51) Int. Cl.
*G06F 11/00* (2006.01)
(52) U.S. Cl. ........................................ 714/6.1; 714/6.22
(58) Field of Classification Search .................. 714/6, 5, 714/7, 8, 9–13, 6.1, 6.11, 6.12, 6.13, 6.2, 714/6.21, 6.22, 6.23, 6.24; 711/114, 118, 711/144, 145
See application file for complete search history.

(56) References Cited

U.S. PATENT DOCUMENTS

| 5,148,432 | A  | * | 9/1992 | Gordon et al. .................... 714/7 |
| 6,052,759 | A  | * | 4/2000 | Stallmo et al. ................ 711/114 |
| 2006/0206752 | A1 |   | 9/2006 | Ikeuchi et al. |
| 2008/0168304 | A1 | * | 7/2008 | Flynn et al. ....................... 714/7 |

FOREIGN PATENT DOCUMENTS

| JP | 2003-167688 A | 6/2003 |
| JP | 2006-252414 A | 9/2006 |

* cited by examiner

*Primary Examiner* — Dieu-Minh Le
(74) *Attorney, Agent, or Firm* — Fujitsu Patent Center

(57) ABSTRACT

According to an aspect of an embodiment, a method for controlling a controller connected to a plurality of storage units storing data, the controller including a cache and a buffer, the method comprising the steps of: storing data in the cache; generating parity data corresponding to the data and storing the parity data in the buffer; writing the data and the parity data into the plurality of the storage units; comparing the parity data stored in the buffer with the parity data written into and read out from at least one of the storage unit; deleting, when the parity data stored in the buffer is different from the parity data read out from the storage unit, the parity data from the buffer; and regenerating parity data from data stored in the cache and rewriting the regenerated parity data into at least one of the storage unit.

8 Claims, 16 Drawing Sheets

Fig. 2

| | 201 | 202 | 203 | 204 | 205 |
|---|---|---|---|---|---|
| Pre | Old Data109 | Old Data205 | Old Data206 | Old Parity110 | CONSISTENCY: ○ |
| After | New Data108 | Old Data205 | Old Data206 | Old Parity110 | CONSISTENCY: × |

DATA WRITING METHOD

BACKGROUND

1. Field

This technique relates to a control technique of a RAID controller regarding recovery from a write error in writing data to a disk.

2. Description of the Related Art

A RAID (redundant arrays of inexpensive (independent) disks) is a typical disk array device. The RAID can construct an inexpensive, highly-reliable storage system. In particular, RAIDs 5 and 6 have been widely used. The RAIDs are very useful devices.

However, even a RAID system configured by, for example, the RAIDs 5 and 6 has a problem that would occur if a RAID controller successfully writes data to a disk but fails to write parity data corresponding to the data to the disk. In such a case, the RAID controller continues to store the parity data in a parity buffer until succeeding in a retry to write the parity data to the disk. Meanwhile, the resource of the parity buffer is limited.

Therefore, if the RAID controller sequentially receives a new write command from a host computer or accepts high-load write processing while keeping the parity data in the parity buffer, a capacity of the parity buffer runs short, resulting in a problem that the RAID controller makes an error reply to the host computer (job_abend).

Japanese Laid-open Patent Publication Nos. 2006-252414 and 2003-167688 disclose techniques regarding the RAID.

SUMMARY

According to an aspect of an embodiment, a method for controlling a controller connected to a plurality of storage units storing data, the controller including a cache and a buffer, the method comprising the steps of: storing data in the cache; generating parity data corresponding to the data stored in the cache and storing the parity data in the buffer; writing the data stored in the cache and the parity data stored in the buffer into the plurality of the storage units; comparing the parity data stored in the buffer with the parity data written into and read out from at least one of the storage unit; deleting, when the parity data stored in the buffer is different from the parity data read out from the storage unit, the parity data from the buffer; and regenerating parity data from data stored in the cache and rewriting the regenerated parity data into one of the storage unit.

BRIEF DESCRIPTION OF THE DRAWINGS

FIG. 2 shows a data table according to the embodiment of the present invention;

DESCRIPTION OF THE PREFERRED EMBODIMENTS

Hereinafter, control processing regarding exhaustion of a buffer capacity of a controller module in a RAID system will be described.

First Embodiment

[1. RAID System 100]

Figure 1:
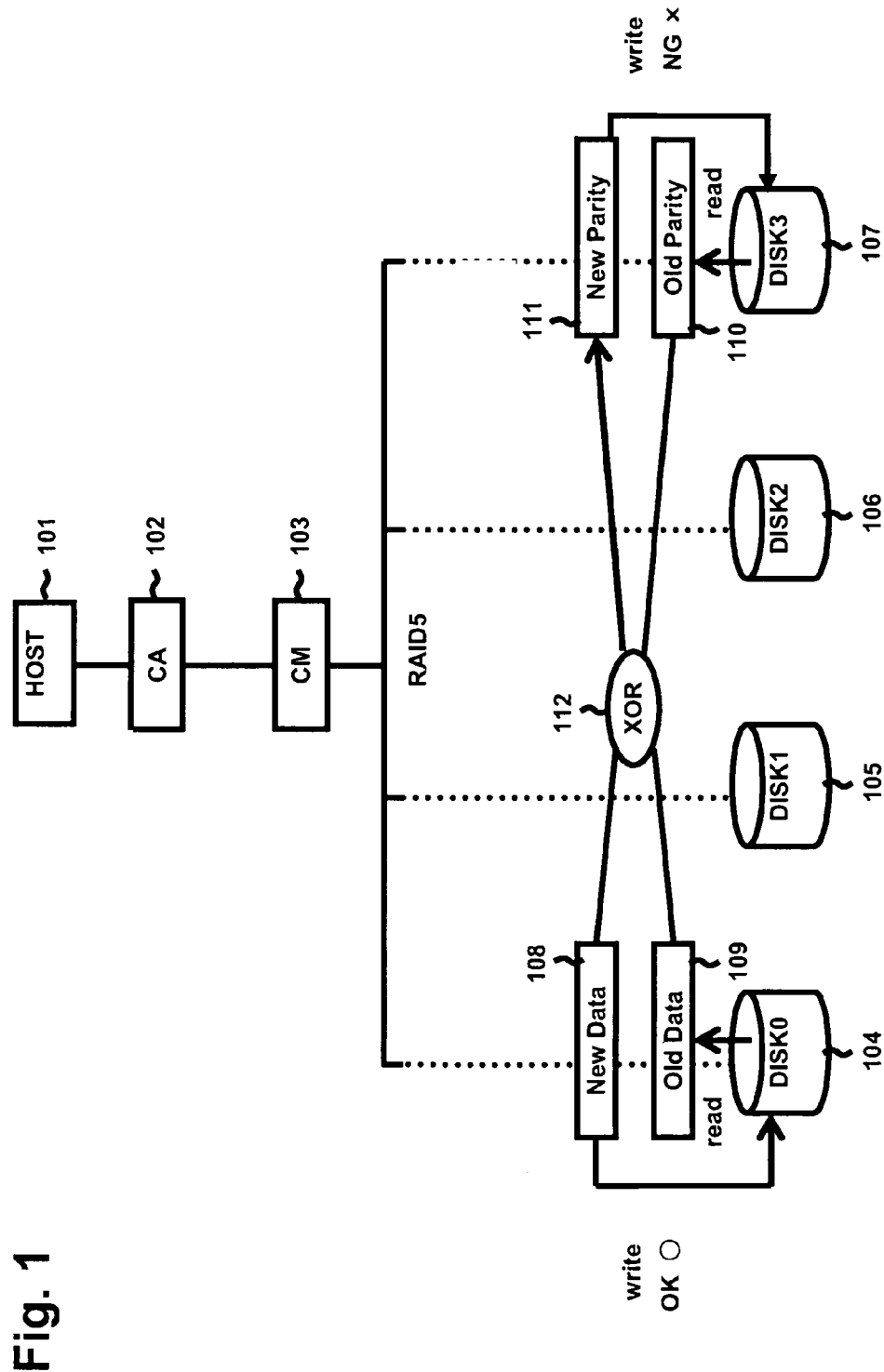
FIG. 1 is a diagram showing a RAID system according to an embodiment of the present invention.

FIG. 1 is a diagram of a RAID system 100 according to a first embodiment of the present invention. The RAID system 100 includes a host computer 101, a CA (channel adaptor) 102, a CM (controller module) 103, and disks 104, 105, 106, and 107. The RAID system 100 is a RAID 5 having the data stripe structure composed of three data stripes and one parity stripe, that is, a so-called (3+1) RAID 5 configuration.

[1.1. Host Computer 101]

The host computer 101 sends a write command and a read command to the CA 102. The host computer 101 sends data to be written to the disks 104 to 107 together with the write command to the CA 102.

[1.2. CA (Channel Adaptor) 102]

The CA 102 controls communications between the host computer 101 and the CM 103. The CA 102 processes a write command or a read command sent from the host computer 101 to the CM 103 to control data transfer between the host computer 101 and the CM 103.

[1.3. CM (Controller Module) 103]

The CM 103 distributes and stores data received from the host computer 101 in the disks 104 to 107 through the CA 102. In this embodiment, it is considered that the CM 103 writes data (New Data) 108 in the disk 104 to update parity data (Old Parity) 110 to parity data (New Parity) 111.

When writing the data (New Data) 108 to the disk 104, the CM 103 first reads data (Old Data) 109 from the disk 104.

Then, the CM 103 reads the parity data (Old Parity) 110 corresponding to data (Old Data) 109 from the disk 107. The parity data (Old Parity) 110 is obtained by operating exclusive OR between the data (Old Data) 109 and data (data 205 and 206 in FIG. 2) corresponding to the data 109 and stored in the disks 105 and 106.

The CM 103 operates exclusive OR 112 between the data (New Data) 108, the data (Old Data) 109, and the data (Old Parity) 110 to generate data (New Parity) 111. The CM 103 tries to write the data (New Data) 108 to the disk 104 and the data (New Parity) 109 to the disk 107.

If the CM 103 succeeds in writing the data (New Data) 108 to the disk 104 and fails to write the data (New Parity) 109 to the disk 107, a problem of inconsistency between data stored in the disks 104 to 107 occurs.

FIG. 2 shows a data table 200 showing data stored in the disks 104 to 107 according to this embodiment. The data table 200 shows data stored in the disks 104 to 107 before and after the data (New Data) 108 is written to the disk 104. The data shown in the data table 200 is data corresponding to one stripe stored in the disks 104 to 107. The disks 104 to 107 also store data other than the data shown in the data table 200. A column 201 indicates data stored in the disk 104, a column 202 indicates data stored in the disk 105, a column 203 indicates data stored in the disk 106, and a column 204 indicates data stored in the disk 107.

Before the CM 103 writes data to the disks 104 and 107 (Pre), the disk 104 stores the data (Old Data) 109, the disk 105 stores data (Old Data) 205, the disk 106 stores data (Old Data) 206, and the disk 107 stores the parity data (Old Parity) 110. Data stored in the disks 104 to 107 are consistent.

After the CM 103 writes the data (New Data) 108 to the disk 104 (After), the disk 104 stores the data (New Data) 108, the disk 105 stores the data (Old Data) 205, the disk 106 stores the data (Old Data) 206, and the disk 107 stores the parity data (Old Parity) 110.

In this embodiment, the CM 103 fails in writing the parity data (New Parity) 111 to the disk 107. Thus, after the CM 103 writes the data (New Data) 108 to the disk 104 (After), data stored in the disks 104 to 107 are inconsistent.

If the CM 103 fails to write the parity data (Old Parity 110 to the disk 107, the CM 103 stores the failed parity data (New Parity) 111 to a parity buffer. Under such a condition that the CM 103 stores the parity data 111 in the parity buffer, if the CM 103 tries to write additional data to the disks 104 to 107 in response to a command from the host computer 101 or the like, a problem of capacity shortage of the parity buffer of the CM 103 occurs.

[1.3.1. Control Processing Regarding Exhaustion of Buffer Capacity]

To overcome the above problem regarding the exhaustion of a buffer capacity, the CM 103 performs the following processing for control over the exhaustion of a capacity of the parity buffer in the CM 103.

The CM 103 writes the data (Old Data) 109 back to the data buffer in the CM 103. The CM 103 reads the data 205 and 206 corresponding to the data (Old Data) 109 from the disks 105 and 106 and stores the data in a cache thereof. The corresponding data 205 and 206 constitute one stripe together with the data (Old Data) 109 and the parity data (Old Parity) 110. The data constituting one stripe corresponds to data obtained by distributing a certain amount of data as the target of a write command from the host computer 101, to the disks 104 to 107. The stripe is composed of consecutively addressed blocks in the disks 104 to 107. In other words, data constituting one stripe in the plural disks 104 to 107 are data stored in the consecutively addressed blocks in the disks 104 to 107 and having correspondence relationship therebetween.

The CM 103 stores consistent data corresponding to one stripe in a cache. The CM 103 can regenerate the parity data (New Parity) 11 through exclusive OR operation 112 between the data 205, the data 206, and the data (Old Data) 109 stored in the cache 103. Therefore, the CM 103 deletes the parity data (New Parity) 111 stored in the parity buffer from the parity buffer.

At the time of retrying to write the parity data (New Parity) 111 back to the disk 107, the CM 103 regenerates the parity data (New Parity) 111 from the data 205, the data 206, and the data (Old Data) 109 stored in the cache. Then, the CM 103 writes the regenerated parity data (New Parity) 111 to the disk 107.

[1.4. Disks 104 to 106, and 107]

As described above, the disks 104 to 107 store data sent from the host computer 101 through the CM 103 in a distributive manner.

The CM 103 stores data and parity data corresponding to the data in one stripe defined by the disks 104 to 107 in a distributive manner.

Figure 3:
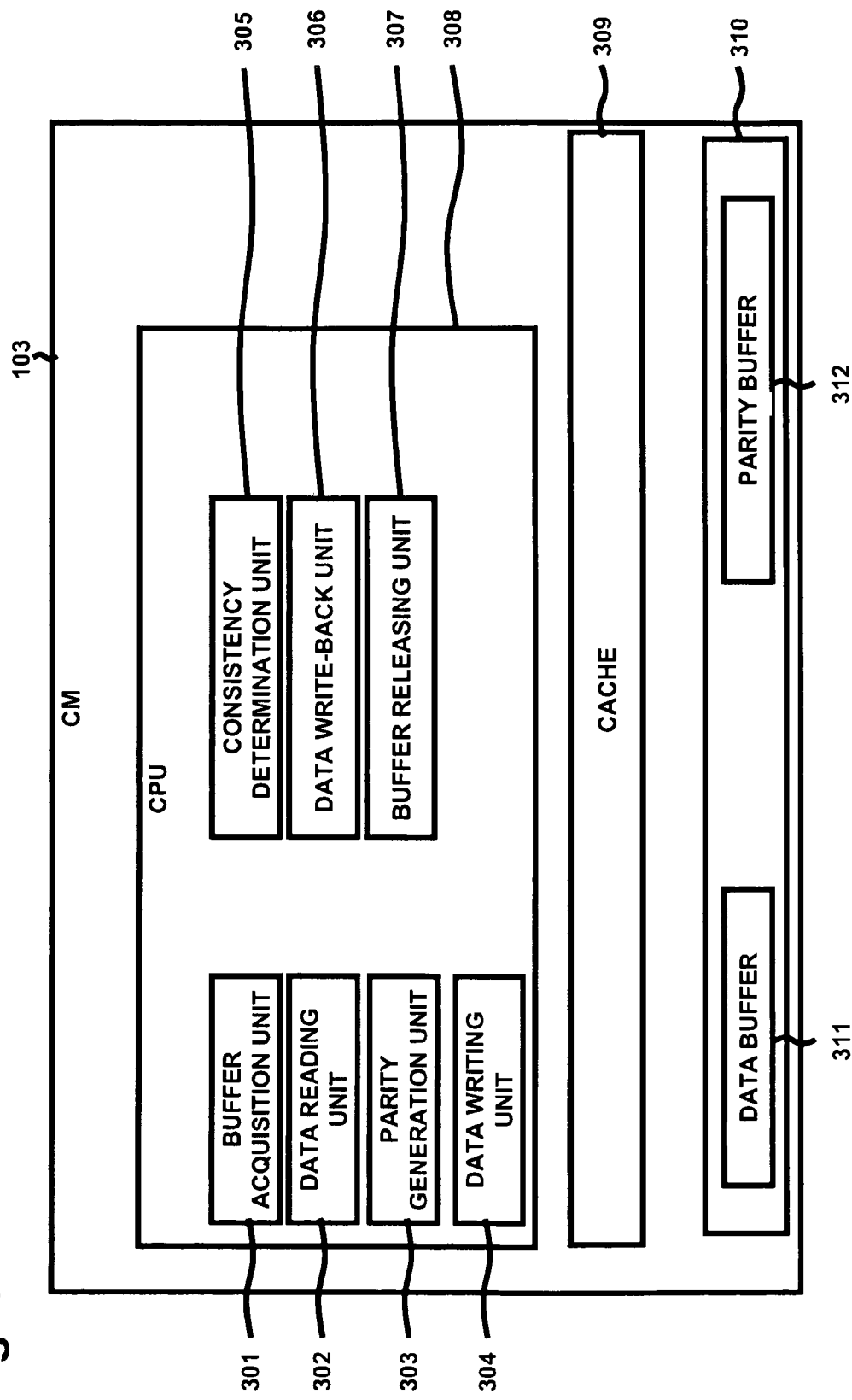
FIG. 3 is a functional block diagram of a CM according to the embodiment of the present invention.

FIG. 3 is a functional block diagram of the CM 103 according to this embodiment.

The CM 103 includes buffer acquisition unit 301, data reading unit 302, parity generation unit 303, data writing unit 304, consistency determination unit 305, data write-back unit 306, and buffer releasing unit 307. The CM 103 further includes, as hardware components, a CPU 308, a cache 309, and a memory 310. The CPU 308 implements the buffer acquisition unit 301, the data reading unit 302, the parity generation unit 303, the data writing unit 304, the consistency determination unit 305, the data write-back unit 306, and the buffer releasing unit 307. The CM 103 executes functions of the above unit and the CPU 308 controls operations of writing/reading data and parity data corresponding to the data to/from the cache 309 and the memory 310. The respective functions of the CM 103 will be described hereinbelow.

[2.1. Buffer Acquisition Unit 301]

The CPU 308 implements the buffer acquisition unit 301 to acquire a data buffer 311 and a parity buffer 312 on the memory 310. If the host computer 101 issues a small write data write command, the buffer acquisition unit 301 secures the data buffer 311 and the parity buffer 312, from which the data (Old Data) 109 and the data (Old Parity) 110 are read, on the memory 310. More specifically, the buffer acquisition unit 301 assigns an area capable of storing the data (Old Data) 109 and the data (Old Parity) 110, within a certain address range in the memory 310.

In addition, a capacity of the data buffer 311 secured on the memory 310 with the buffer acquisition unit 301 is the minimum amount required for storing the data (Old Data) 109, or an amount equal or equivalent to that of the data (Old Data) 109. Likewise, a capacity of the parity buffer 312 secured on the memory 310 with the buffer acquisition unit 301 is the minimum amount required for storing the parity data (Old Parity) 110, or an amount equal or equivalent to that of the parity data (Old Parity) 110. This is due to low probability of error that causes exhaustion of capacities of the data buffer 311 and the parity buffer 312. In other words, capacities of the data buffer 311 and the parity buffer 312 may be determined in consideration of the probability of error and a memory capacity necessary for data write processing. Thus, the buffer acquisition unit 301 secures the data buffer 311 and the parity buffer 312 in accordance with the predefined probability of error and memory capacity necessary for data write processing.

Further, the small write refers to write processing for writing data to a block (0xC0 block or less) having a write area is not larger than ½ of one stripe, in the RAID system 100.

[2.2. Data Reading Unit 302]

The CPU 308 implements the data reading unit 302 to read the data (Old Data) 109 and write the read data to the data buffer 311, and to read the parity data (Old Parity) 110 and write the read data to the parity buffer 312. After the buffer acquisition unit 301 secured the data buffer 311 and the parity buffer 312 on the memory 310, the data reading unit 302 reads the data (Old Data) 109 and writes the read data to the data buffer 311 and reads the parity data (Old Parity) 110 and writes the read data to the parity buffer 312. The data reading unit 302 stores the data (Old Data) 109 in the data buffer 311 and stores the parity data (Old Parity) 110 in the parity buffer 312.

[2.3. Parity Generation Unit 303]

The CPU 308 implements the parity generation unit 303 to generate the parity data (New Parity) 111. First, the parity generation unit 303 operates exclusive OR (XOR) between the data (Old Data) 109 in the data buffer 311 and the parity data (Old Parity) 110 in the parity buffer 312 to obtain an intermediate result and then, operates exclusive OR (XOR) between the intermediate result and the data (New Data) 108 in the cache 309 to generate the parity data (New Parity) 111. The parity generation unit 303 stores the parity data (New Parity) 111 in the parity buffer 312.

[2.4. Data Writing Unit 304]

The CPU 308 implements the data writing unit 304 and tries to write the data (New Data) 108 to the disk 104 and write the parity data (New Parity) 111 to the disk 107. If the data writing unit 304 successfully and normally executes the write processing, the data (New Data) 108 can be written to the disk 104 and the parity data (New Parity) 111 can be written to the disk 107.

However, the data writing unit 304 could not write the parity data (New Parity) 111 to the disk 107 although capable of writing the data (New Data) 108 to the disk 104 due to some factors such as non-synchronous operations for writing data to the disks and contaminants in the disk 107. In this case, the parity buffer 312 continues to store the parity data (New Parity). Therefore, if the host computer 101 issues a new command to write data to the disks 104 to 107, a problem of capacity shortage of the parity buffer 312 occurs. Thus, the RAID system 100 of this embodiment releases the parity buffer 312 and regenerates the parity data (New Parity) 111 upon rewriting the parity data (New Parity) 111 to utilize the resources of the memory 310.

[2.5. Consistency Determination Unit 305]

The CPU 308 implements the consistency determination unit 305 to read the parity data stored in the disk 107 to compare the parity data (New Parity) 111 stored in the parity buffer 312 with the parity data stored in the disk 107. As a result of comparing the parity data (New Parity) 111 stored in the parity buffer 312 with the parity data stored in the disk 107, if the consistency determination unit 305 determines that the parity data (New Parity) 111 does not match the parity data stored in the disk 107, the data writing unit 304 is considered to have failed to write the parity data (New Parity) 111 to the disk 106. Further, as a result of comparing the parity data (New Parity) 111 stored in the parity buffer 312 with the parity data stored in the disk 107, if the consistency determination unit 305 determines that the parity data (New Parity) 111 matches the parity data stored in the disk 107, the data writing unit 304 is considered to have succeeded in writing the parity data (New Parity) 111 to the disk 106.

[2.6. Data Write-Back Unit 306]

The CPU 308 implements the data write-back unit 306 to write the data (Old Data) 109 back to the data buffer 311. If the data write-back unit 306 fails to write the parity data (New Parity) 111 to the disk 107, the data write-back unit 306 writes the data (Old Data) 109 back to the data buffer 311.

Then, the data reading unit 302 reads data that constitutes one stripe together with the data (New Data) 108 and has a correspondence relationship therewith, from the disks 105 and 106 and writes the read data to the cache 309.

[2.7. Buffer Releasing Unit 307]

The CPU 308 implements the buffer releasing unit 307 to delete the parity data (New Parity) 111 stored in the parity buffer 312.

If the data write-back unit 306 writes the data (Old Data) 109 back to the data buffer 311 and in addition, the data reading unit 302 reads data that constitutes one stripe together with the data (New Data) 108 and has a correspondence relationship with the data (New Data) 108, from the disks 105 and 106 and writes the read data to the cache 309, the buffer releasing unit 307 deletes the parity data (New Parity) 111 stored in the parity buffer 312.

This is because the cache 309 already stores the data (New Data) 108 received from the host computer 101 through the CA 102, and the data 205 and 206 read from the disks 105 and 106. In other words, since the cache 309 holds data serving as the parity data (New Parity) 111, the parity buffer 312 does not need to store the parity data (New Parity) 111. Here, if holding the data (New Data) 108, the cache 309 leaves an area for storing the data (Old Data) 205 and the data (Old Data) 206. This is to manage the data stored in the cache 309 in association with data in the disks 104 to 107 constituting one stripe. With this operation, data can be easily managed in the CM 103 and thus, write processing of the CM 103 can be performed at high speeds. Therefore, the CM 103 secures an area for storing data in the cache 309 for each stripe constituted by the disks 104 to 107. Securement unit (not shown), which is implemented by the CPU 308, secures an area for storing data in the cache 309 on a stripe basis.

[3. Flowchart of Control Processing Regarding Exhaustion of Capacity of Parity Buffer 312]

Figure 4:
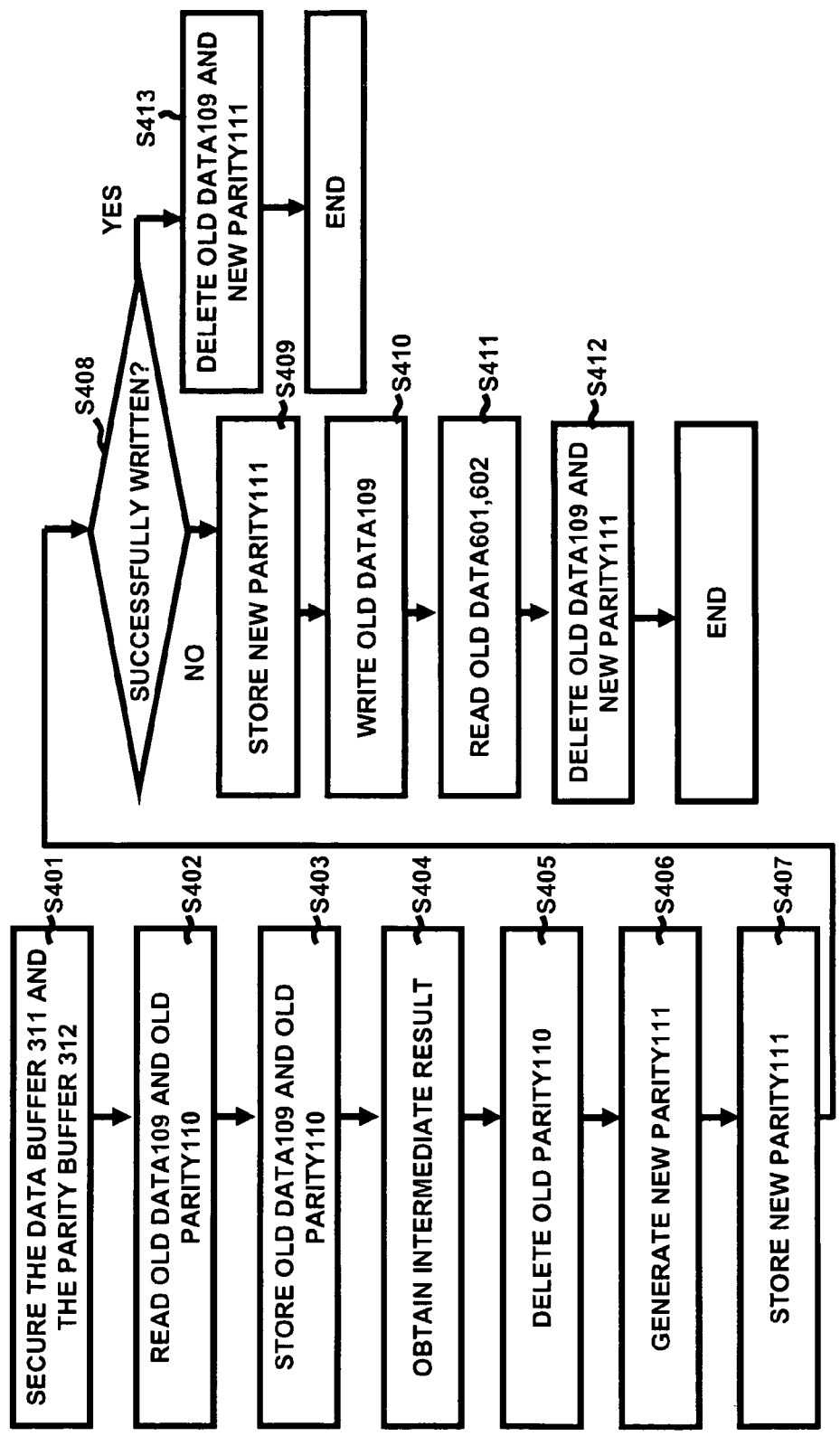
FIG. 4 is a flowchart of control processing regarding exhaustion of a capacity of a parity buffer according to the embodiment of the present invention.

FIG. 4 is a flowchart of control processing regarding exhaustion of a capacity of the parity buffer 312 in the CM 103 according to this embodiment.

If the host computer 101 issues a small write data write command, the buffer acquisition unit 301 secures the data buffer 311 and the parity buffer 312, from which the data (Old Data) 109 and the data (Old Parity) 110 are read, on the memory 310 (step S401).

After the buffer acquisition unit 301 secured the data buffer 311 and the parity buffer 312 on the memory 310, the data reading unit 302 reads the data (Old Data) 109 and writes the read data to the data buffer 311, and reads the parity data (Old Parity) 110 and writes the read data to the parity buffer 312 (step S402). The data buffer 311 stores the data (Old Data) 109, and the parity buffer 312 stores the parity data (Old Parity) 110 (step S403).

The parity generation unit 303 operates exclusive OR (XOR) between the data (Old Data) 109 in the data buffer 311 and the parity data (Old Parity) 110 in the parity buffer 312 to obtain an intermediate result (step S404). The parity generation unit 303 deletes the parity data (Old Parity) 110 from the parity buffer 312 (step S405). Then, the parity generation unit 303 operates exclusive OR (XOR) between the intermediate result and the data (New Data) 108 in the cache 309 to generate the parity data (New Parity) 111 (step S406). The parity generation unit 303 stores the parity data (New Parity) 111 in the parity buffer 312 (step S407).

Then, the data writing unit 304 tries to write the data (New Data) 108 in the disk 104 and write the parity data (New Parity) 111 in the disk 107, and determines whether the parity data (New Parity) 111 was successfully written (step S408). The consistency determination unit 305 is implemented to read the parity data stored in the disk 107 to compare the parity data (New Parity) 111 stored in the parity buffer 312 with the parity data stored in the disk 107. As a result of comparing the parity data (New Parity) 111 stored in the parity buffer 312 with the parity data stored in the disk 107, if the consistency determination unit 305 determines that the parity data (New Parity) 111 does not match the parity data stored in the disk 107, the data writing unit 304 is considered to have failed to write the parity data (New Parity) 111 to the disk 106 (NO in step S408). Further, as a result of comparing the parity data (New Parity) 111 stored in the parity buffer 312 with the parity data stored in the disk 107, if the consistency determination unit 305 determines that the parity data (New Parity) 111 matches the parity data stored in the disk 107, the data writing unit 304 is considered to have succeeded in writing the parity data (New Parity) 111 to the disk 106 (YES in step S408).

If the data writing unit 304 is considered to have succeeded in writing the data (New Data) 108 in the disk 107 and writing the parity data (New Parity) 111 to the disk 106 (YES in step S408), the buffer releasing unit 307 deletes the parity data (New Parity) 111 stored in the parity buffer 312 and the data (Old Data) 109 stored in the data buffer 311 (step S413). The CM 103 terminates the data write processing. If the data writing unit 304 is considered to have failed to write the parity data (New Parity) 111 to the disk 107 (NO in step S408), the parity buffer 312 continues to store the parity data (New Parity) 111 (step S409).

Then, the data write-back unit 306 writes the data (Old Data) 109 back to the disk 104 (step S410). This is to maintain consistency between data in the disks 104 to 107. Subsequently, the data write-back unit 306 reads the data (Old Data) 205 and the data (Old Data) 206 from the disks 105 and 106 and writes the read data to the cache 309 (step S411). The data (Old Data) 205 and the data (Old Data) 206 constitute one stripe together with the data (New Data) 108 and have a correspondence relationship therewith.

The buffer releasing unit 307 deletes the data (Old Data) 109 stored in the data buffer 311 and the parity data (New Parity) 111 stored in the parity buffer 312 (step S412).

Figure 5:
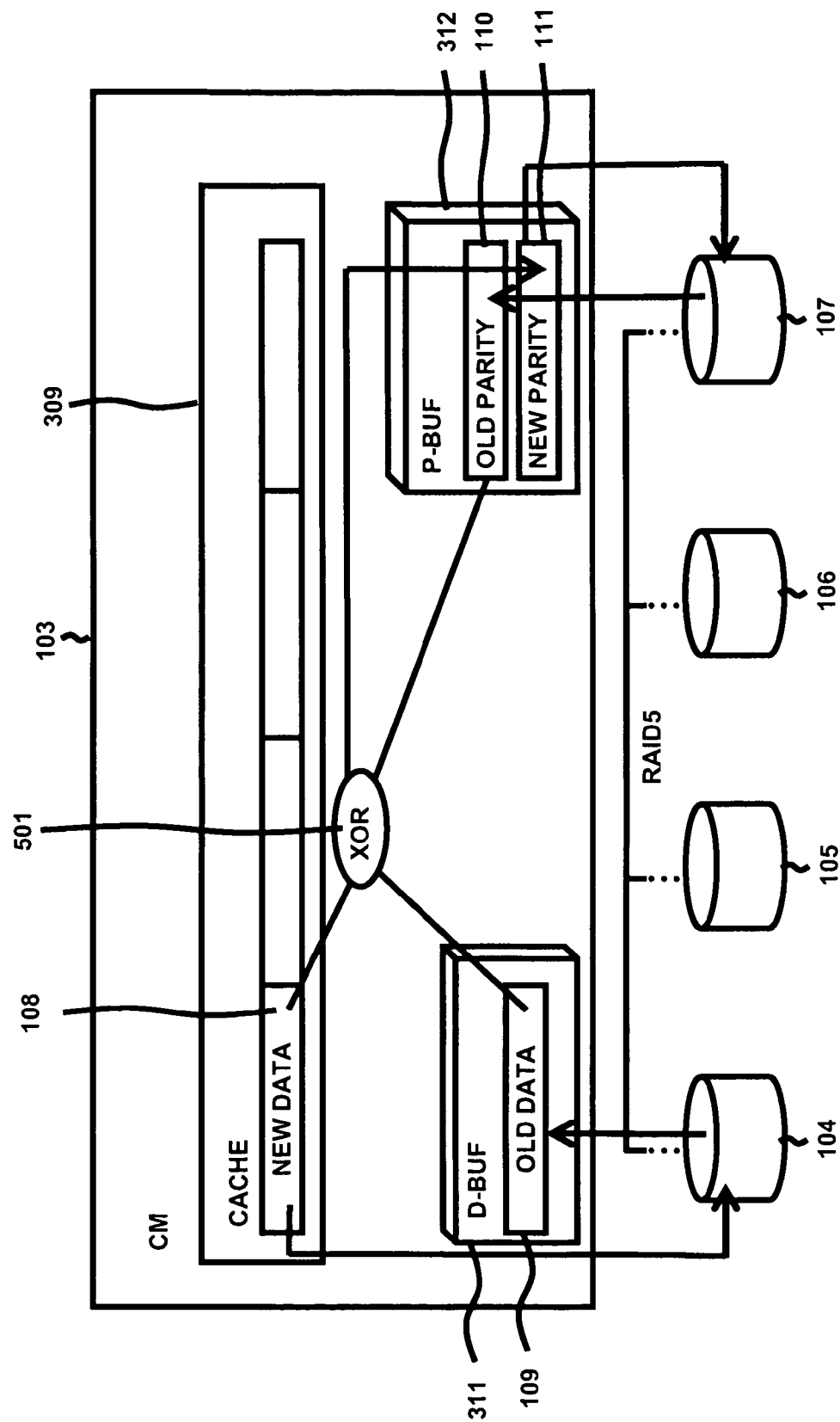
FIG. 5 is a schematic diagram illustrating the flowchart of control processing regarding exhaustion of a capacity of the parity buffer according to the embodiment of the present invention.
Figure 6:
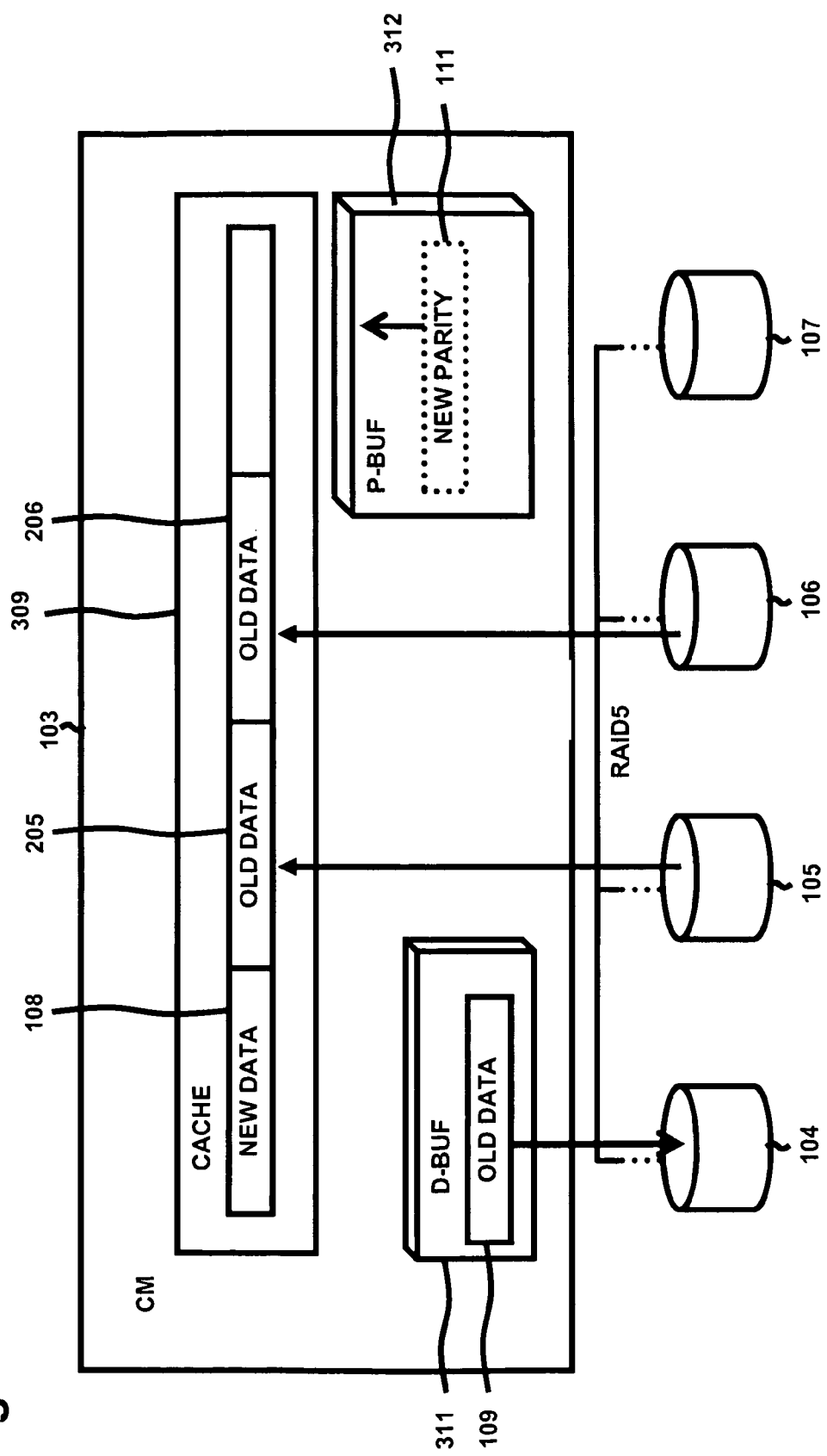
FIG. 6 is a schematic diagram illustrating the flowchart of control processing regarding exhaustion of a capacity of the parity buffer according to the embodiment of the present invention.
Figure 7:
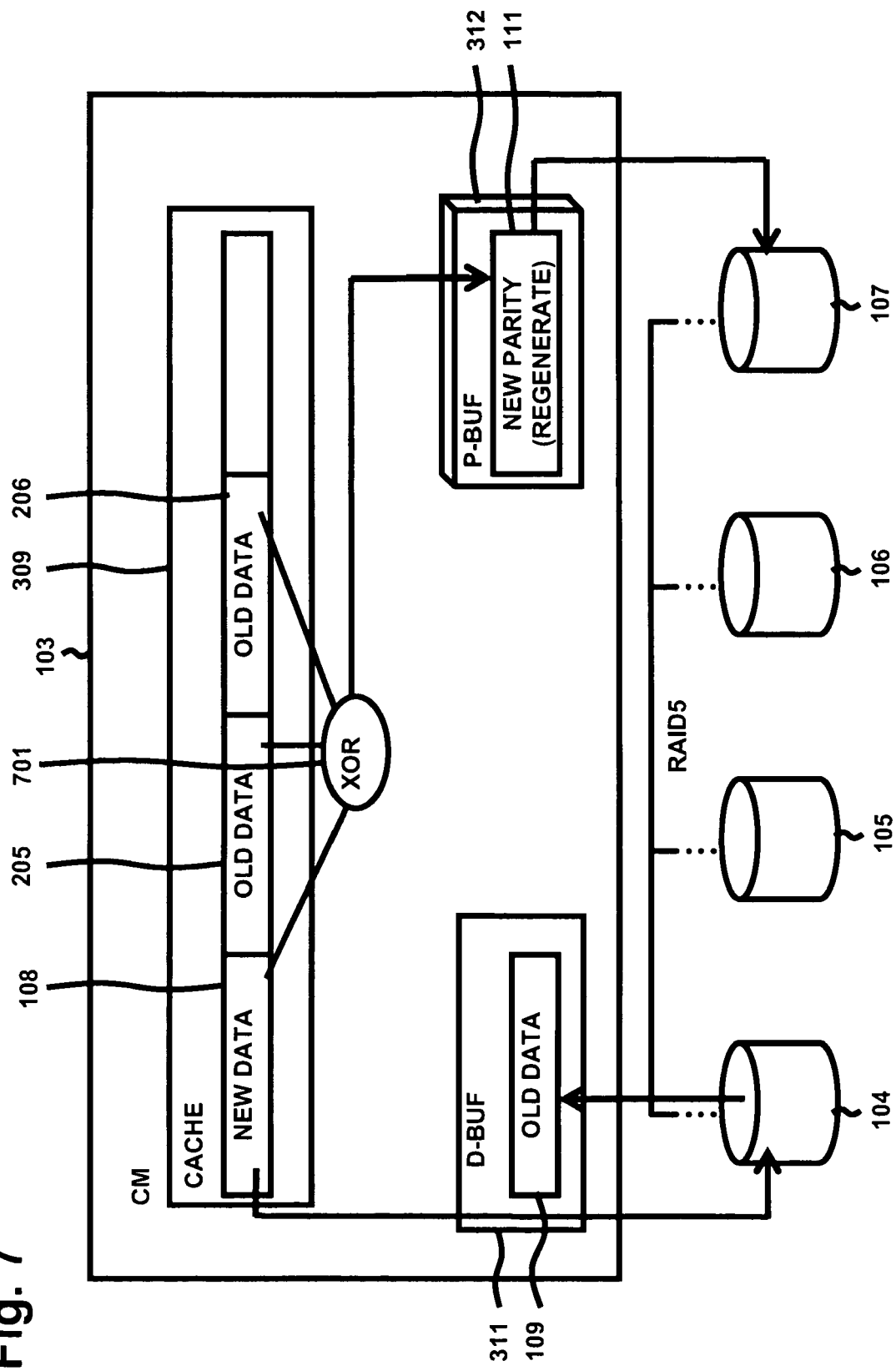
FIG. 7 illustrates command retry processing according to the embodiment of the present invention.

FIGS. 5 to 7 illustrate the control processing regarding exhaustion of a buffer capacity in the flowchart of FIG. 4. FIG. 5 illustrates how to generate the parity data (New Data) 111 in the CM 103. FIG. 6 illustrates how to read the data (Old Data) 205 and the data (Old Data) 206 in the CM 103.

The buffer acquisition unit 301 of the CM 103 secures the data buffer 311 and the parity buffer 312 on the memory 310. Subsequently, the data reading unit 302 of the CM 103 reads the data (Old Data) 109 and writes the read data to the data buffer 311, and reads the parity data (Old Parity) 110 and writes the read data to the parity buffer 312. The data reading unit 302 of the CM 103 stores the data (Old Data) 109 in the data buffer 311 and stores the parity data (Old Parity) 110 in the parity buffer 312. The parity generation unit 303 operates exclusive OR (XOR) 501 between the data (Old Data) 109, the parity data (Old Parity) 110, and the data (New Data) 108 to generate the parity data (New Parity) 111. The parity generation unit 303 stores the parity data (New Parity) 111 in the parity buffer 312. Then, the data writing unit 304 tries to write the data (New Data) 108 in the disk 104 and write the parity data (New Parity) 111 in the disk 107.

Next, in the illustrated example of FIG. 6, if the data writing unit 304 is considered to have failed to write the parity data (New Parity) 111 to the disk 107, the parity buffer 312 continues to store the parity data (New Parity). Then, the data write-back unit 306 writes the data (Old Data) 109 back to the disk 104. Subsequently, the data write-back unit 306 reads the data (Old Data) 205 and the data (Old Data) 206 and writes the read data to the cache 309. The buffer releasing unit 307 deletes the data (Old Data) 109 stored in the data buffer 311, and the parity data (New Parity) 111 stored in the parity buffer 312.

[4. Flowchart of Command Retry Processing]

Figure 8:
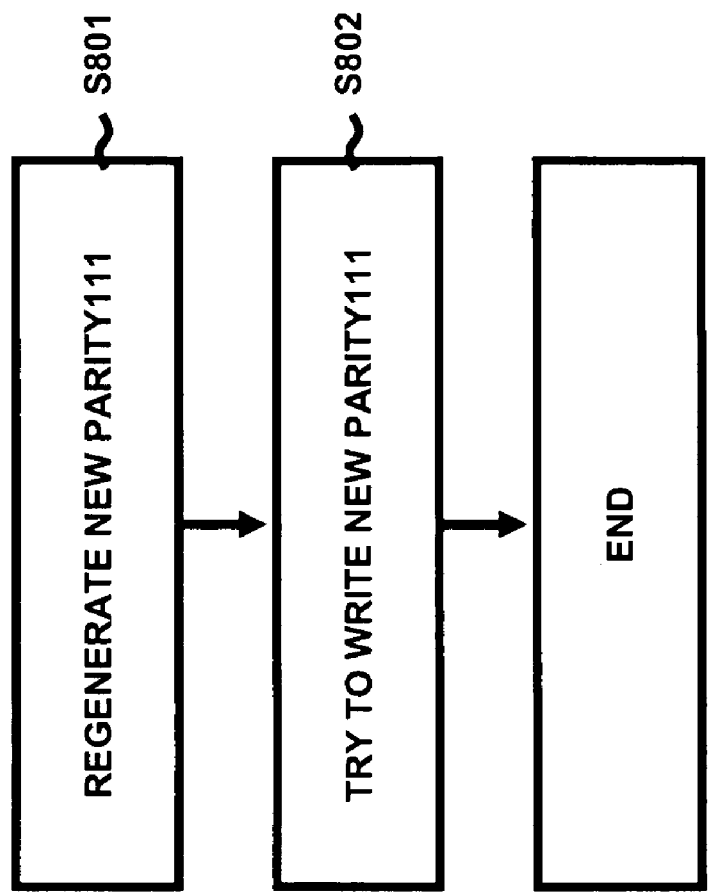
FIG. 8 is a flowchart of the command retry processing according to the embodiment of the present invention.

FIG. 7 illustrates command retry processing according to this embodiment. FIG. 8 is a flowchart of command retry processing executed by the CM 103 according to this embodiment.

When the CM 103 retries to write the parity data (New Parity) 111 to the disk 107 (executes command retry), the parity generation unit 303 regenerates the parity data (New Parity) 111 from the data (New Data) 108 stored in the cache 309 and the data (Old Data) 205 and 206 having a correspondence relationship with the data (New Data) 108 (step S801). In other word, the parity generation unit 303 operates exclusive OR (XOR) 701 between the data (New Data) 108, the data (Old Data) 1205, and 206 to generate the parity data (New Parity) 111.

The buffer acquisition unit 301 secures the parity buffer 312 on the memory 310 again, and the data writing unit 304 tries to write the parity data (New Parity) 111 to the disk 107 (step S802). The CM 103 makes a retry to rewrite the parity data (New Parity) 111 to the disk 107 (command retry) at regular time intervals. Thus, the parity generation unit 303 regenerates the parity data (New Parity) 111 at regular time intervals. The parity generation unit 303 regenerates the parity data (New Parity) 111 in accordance with a load factor of the CM 103 (more specifically, a load factor of the CPU 308). In other words, if a higher load is applied to the CM 103, the parity generation unit 303 regenerates the parity data (New Parity) 111 at longer time intervals. If a factor of load applied to the CM 103 is not higher than a predetermined threshold value, the parity generation unit 303 regenerates the parity data (New Parity) 111. Since the parity generation unit 303 regenerates the parity data (New Parity) 111 if determining that a factor of load applied to the CM 103 is not higher than a predetermined threshold value, in the case of a factor of load applied to the CM 103 is higher than a predetermined threshold value, a time interval at which the parity generation unit 303 regenerates the parity data (New Parity) 111 is "∞". Here, the threshold value is preset in accordance with an operating environment of the RAID system 100.

Second Embodiment

[5. RAID system 900]

Figure 9:
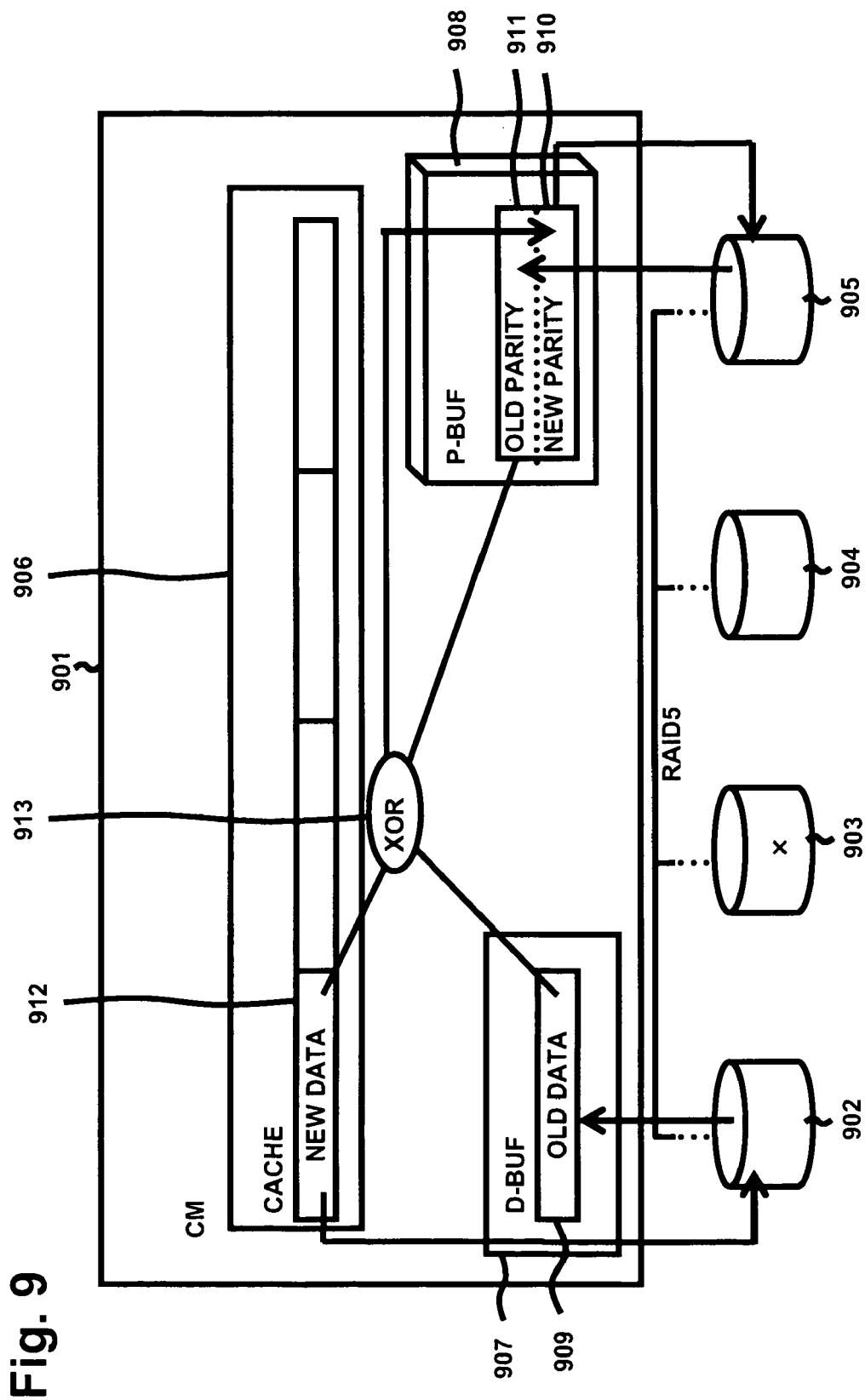
FIG. 9 is a diagram of a RAID system according to another embodiment of the present invention.

FIG. 9 is a diagram of a RAID system 900 according to a second embodiment of the present invention. The RAID system 900 is configured using the RAID 5 similar to the RAID system 100. The RAID system 900 includes a host computer, a CA (channel adaptor), a CM (control module) 901, and disks 902 to 905. Here described is the RAID system 900 in which any failure occurs in the disk 903 and a so-called RAID configuration degenerates. Further, it is assumed that a failure occurs in the disk 903 when parity data (New Parity) 911 is successfully written to the disk 905.

A problem to be solved by this embodiment will be described in detail below. If the CM 901 stores data (New Data) 912 received from the host computer in a cache 906, the CM 901 reads data (Old Data) 909 to a data buffer 907. Further, the CM 901 reads parity data (Old Parity) 910 to a parity buffer 908. Then, the CM 901 generates parity data (Old Parity) 911. The parity data (Old Parity) 911 is generated in accordance with a generation procedure similar to that for the parity data (New Parity) 111. The CM 901 writes the generated parity data (New Parity) 911 to the parity buffer 908, and deletes the parity data (Old Parity) 910 stored in the parity buffer 908. After that, the CM 901 successfully writes the parity data (New Parity) 911 to the disk 905. A failure occurs in the disk 903 of the CM 901. As a result, the CM 901 cannot extract data (Old Data) stored in the disk 903. Further, if the CM 901 failed to write the data (New Data) 912 to the disk, a problem occurs unless data consistency is secured in one stripe constituted by the disks 902 to 905.

To elaborate, the problem to be solved by the RAID system 900 of this embodiment is how to handle a failure in the disk 903 and an error in writing the data (New Data) 912 to the disk 902.

[6. CM 901]

Figure 10:
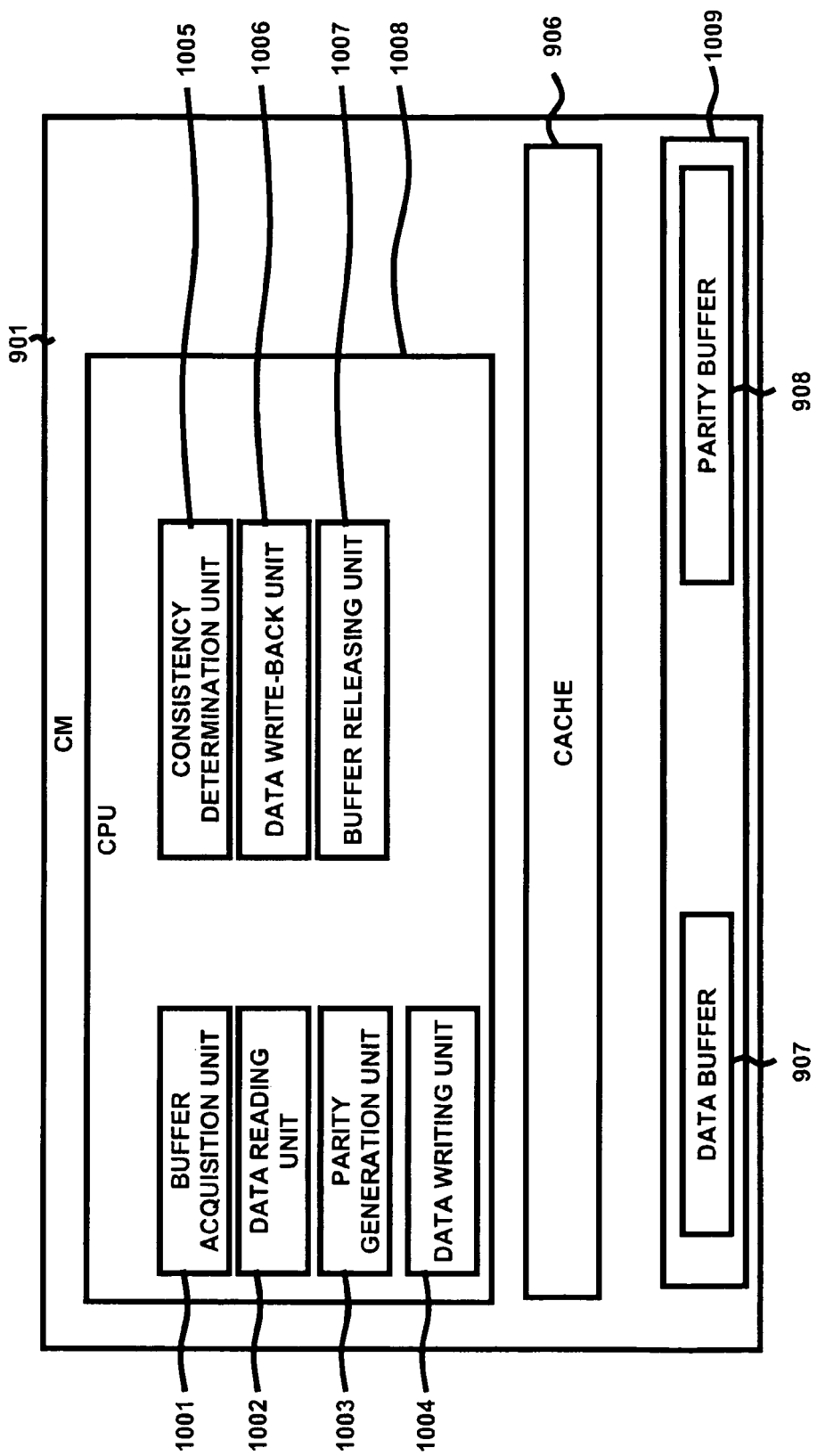
FIG. 10 is a functional block diagram of a CM according to the embodiment of the present invention.
Figure 11:
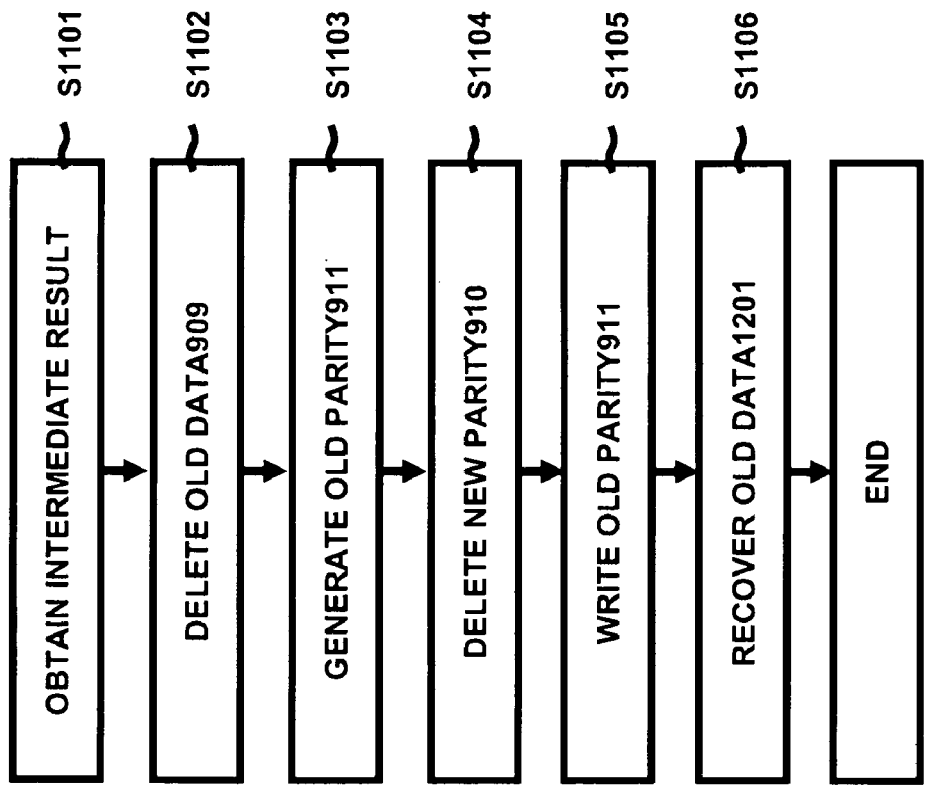
FIG. 11 is a flowchart of processing for recovering data (Old Data) according to the embodiment of the present invention.
Figure 12:
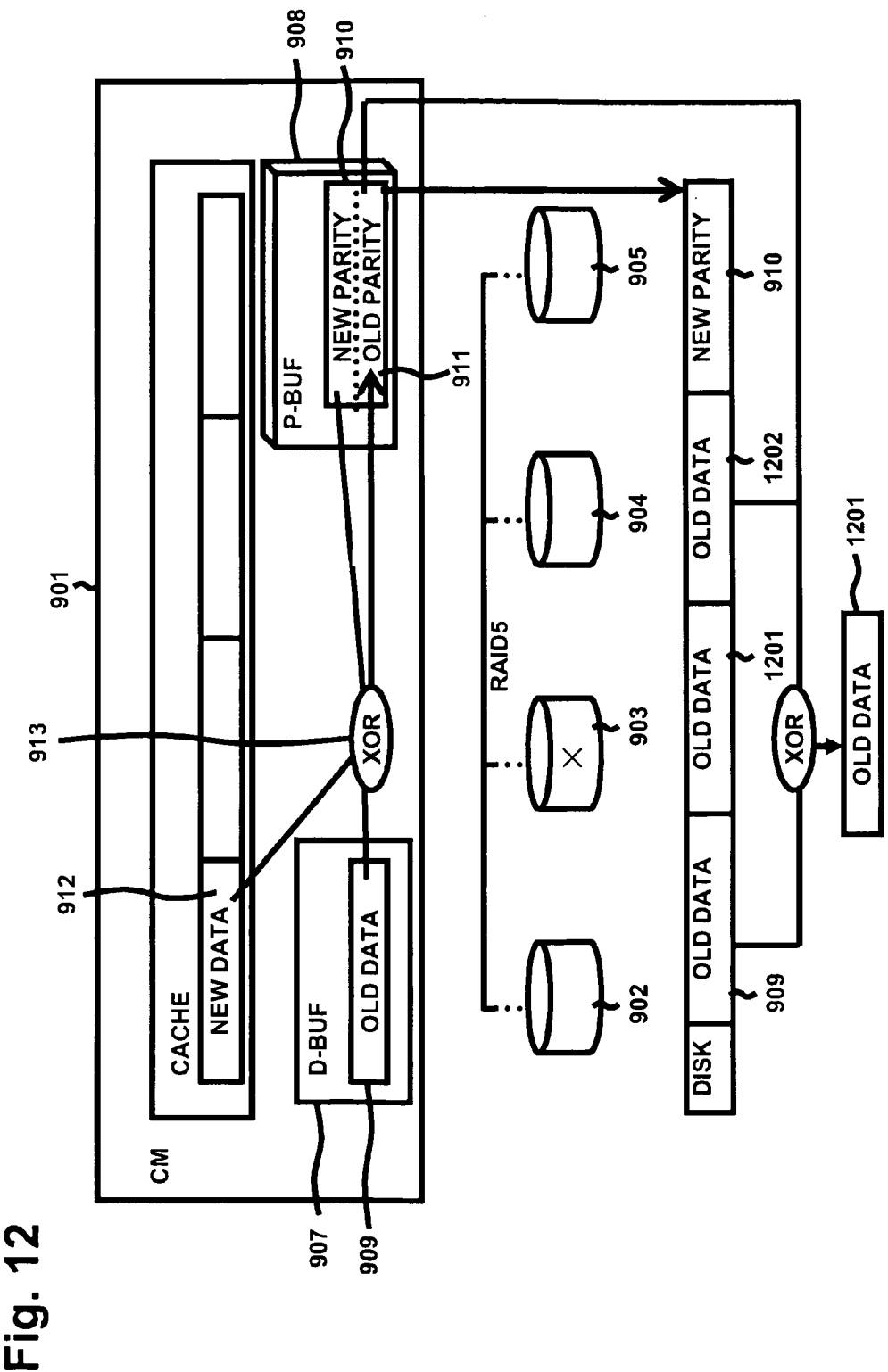
FIG. 12 illustrates a processing procedure for recovering the data (Old Data) from a disk.

FIG. 10 is a functional block diagram of the CM 901 according to this embodiment. FIG. 11 is a flowchart of processing for recovering data (Old Data) 1201 according to this embodiment. FIG. 12 illustrates a procedure for the processing for recovering the data (Old Data) 1201 from the disk 903. Functions of the CM 901 for executing each processing procedure are illustrated in FIG. 10.

Buffer acquisition unit 1001 shown in FIG. 10 secures the data buffer 907 and the parity buffer 908 on a memory 1009. Data reading unit 1002 reads the data (Old Data) 909 to the data buffer 907 and reads the parity data (New Parity) 910 to the parity buffer 908.

Parity generation unit 1003 first operates exclusive OR 913 between the data (New Data) 912 stored in the cache 906 and the data (Old Data) 909 stored in the data buffer 907 to obtain an intermediate result (step S1101). The parity generation unit 1003 deletes the data (Old Data) 909 from the data buffer 907 (step S1102). Then, the parity generation unit 1003 operates exclusive OR between the intermediate result obtained in step S1101 and the parity data (New Parity) 910 stored in the parity buffer 908 to generate the parity data (Old Parity) 911 (step S1103). The parity generation unit 1003 stores the parity data (Old Parity) 911 in the parity buffer and deletes the parity data (New Parity) 910 from the parity buffer 908 (step S1104).

Then, data writing unit 1004 writes the parity data (Old Parity) 911 back to the disk 905 (step S1105). At this time, consistency determination unit 1005 reads parity data stored in the disk 905 to compare the parity data (Old Parity) 911 stored in the data buffer 907 with the parity data stored in the disk 905. As a result of comparing the parity data (Old Parity) 911 stored in the data buffer 907 with the parity data stored in the disk 905, if the consistency determination unit 1005 determines that the parity data (Old Parity) 911 stored in the data buffer 907 does not match the parity data stored in the disk 905, the data writing unit 1004 is considered to have failed to write the parity data (Old Parity) 911 back to the disk 905. As a result of comparing the parity data (Old Parity) 911 stored in the data buffer 907 with the parity data stored in the disk 905, if the consistency determination unit 1005 determines that the parity data (Old Parity) 911 stored in the data buffer 907 matches the parity data stored in the disk 905, the data writing unit 1004 is considered to have succeeded in writing the parity data (Old Parity) 911 back to the disk 905.

Further, the parity generation unit 1003 operates exclusive OR between the data (Old Data) 909 stored in the disk 902, the data (Old Data) 1202 stored in the disk 904, and the parity data (Old Parity) 900 stored in the disk 905 to recover the data (Old Data) 1201 (step S1106).

[7. Flowchart of Processing for Releasing Buffer]

Figure 13:
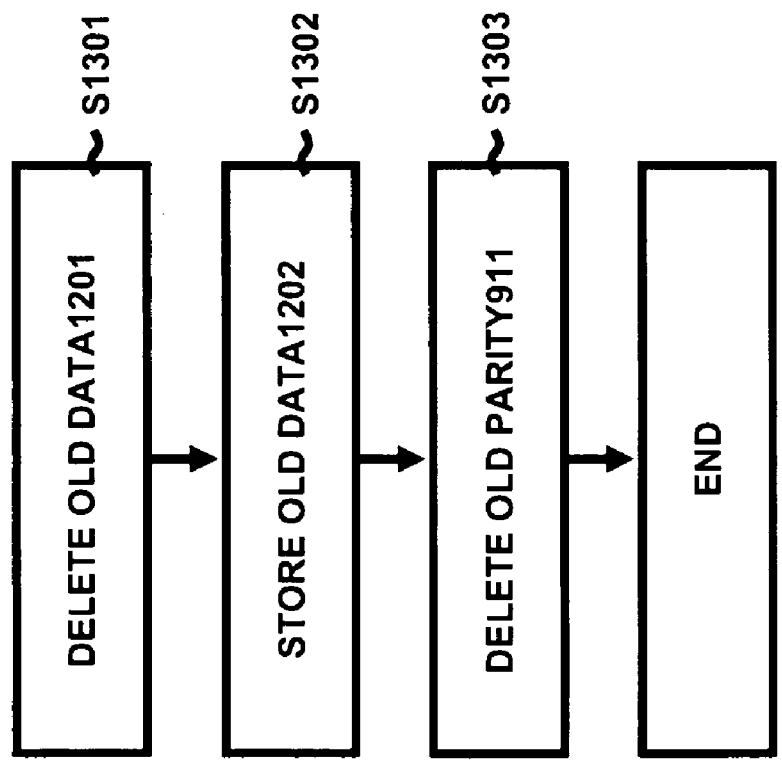
FIG. 13 is a flowchart of processing for releasing a data buffer and a parity buffer according to the embodiment of the present invention.

FIG. 13 is a flowchart of how to release the data buffer 907 and the parity buffer 908 according to this embodiment.

Data write-back unit 1006 reads the data (Old Data) 1201 to the cache 906, and the cache 906 stores the data (Old Data) 1201 (step S1301). Further, the data write-back unit 1006 reads the data (Old Data) 1202 to the cache 906, and the cache 906 stores the data (Old Data) 1202 (step S1302). The data (Old Data) 1201 and 1202 have a correspondence relationship with the data (New Data) 912. The correspondence relationship unit such a relationship as can derive the parity data (New Parity) 911 with the parity generation unit 1003 through exclusive OR operation between the data (Old Data) 1201 and 1202, and the data (New Data) 912. In the disks 902 to 904, the data (Old Data) 1201 and 1202, the data (New Data) 912, and the parity data (New Parity) 911 constitute one stripe.

Buffer releasing unit 1007 deletes the data (Old Data) 909 stored in the data buffer 907 and in addition, deletes the parity data (Old Parity) 911 stored in the parity buffer 908 (step S1303). As a result, the data buffer 907 and the parity buffer 908 can be released, and exhaustion of a buffer capacity, which would occur due to a failure in writing data to the disk, can be prevented.

Figure 14:
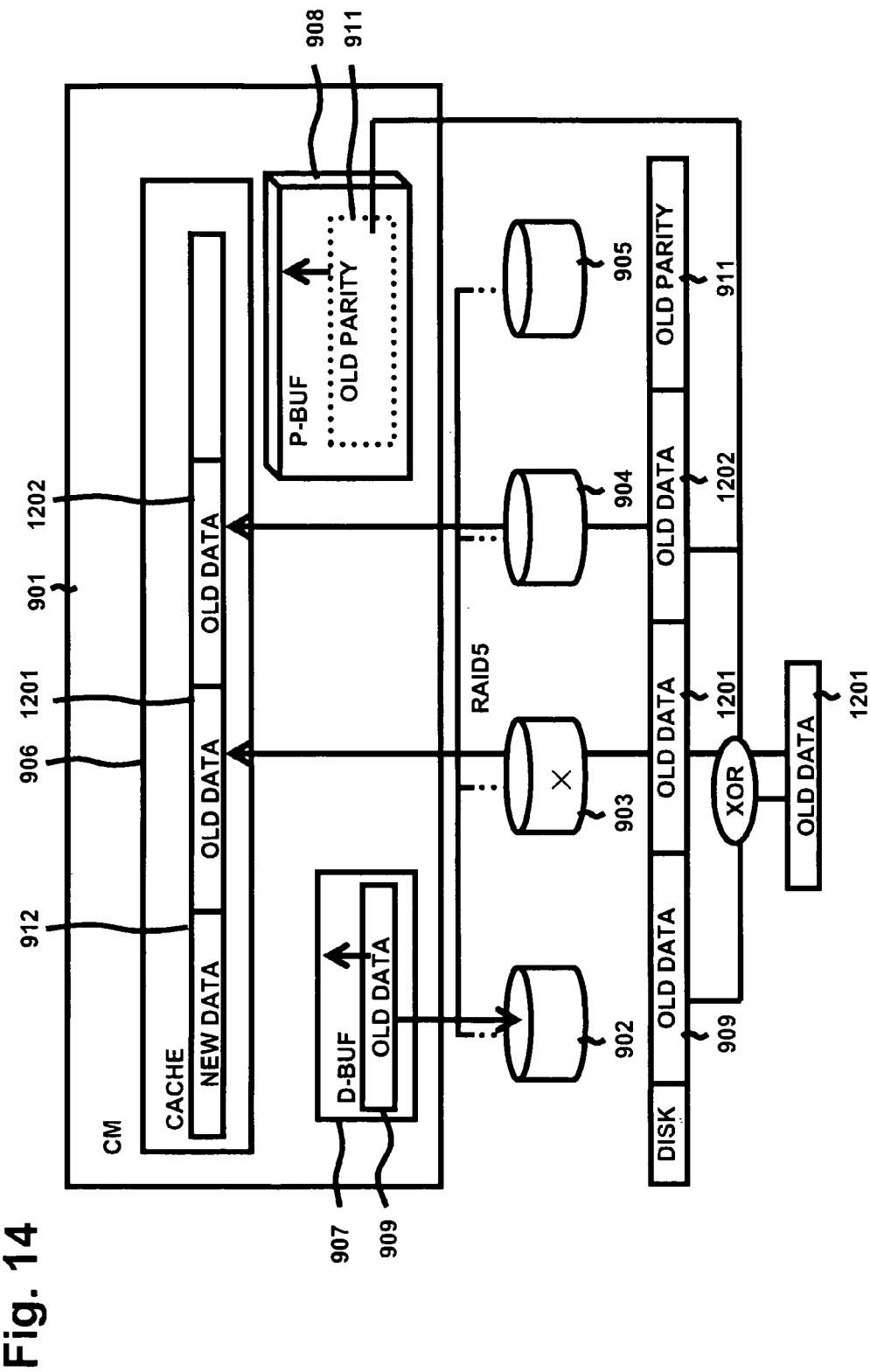
FIG. 14 illustrate of the processing for releasing the data buffer and the parity buffer according to the embodiment of the present invention.

FIG. 14 illustrates how to release the data buffer 907 and the parity buffer 908 according to this embodiment.

As illustrated in the flowchart of FIG. 13, the data write-back unit 1006 reads the data (Old Data) 1201 and the data (Old Data) 1202 to the cache 906.

The buffer releasing unit 1007 deletes the data (Old Data) 909 stored in the data buffer 907 and the parity data (Old Parity) 910 stored in the parity buffer 908.

Then, when the data writing unit 1004 tries to rewrite the data (New Data) 912 to the disk 902 and rewrite the parity data (New Parity) 911 to the disk 905 (executes command retry), the parity generation unit 1003 regenerates the parity data (New Parity) 910 from the data (New Data) 912 stored in the cache 906 and the data (Old Data) 1201 and 1202 having a correspondence relationship with the data (New Data) 912.

The buffer acquisition unit 1001 secures the parity buffer 908 on the memory 1009 again. Then, the data writing unit 1004 tries to write the parity data (New Parity) 905 to the disk 107 through the parity buffer 908. Further, the data writing unit 1004 tries to write the data (New Data) 912 to the disk 902.

The CM 901 makes a retry to write the parity data (New Parity) 910 to the disk 905 and write the data (New Data) 912 to the disk 902 (command retry) at regular time intervals.

Thus, the parity generation unit 1003 regenerates the parity data (New Parity) 910 at regular time intervals. The parity generation unit 1003 regenerates the parity data (New Parity) 910 in accordance with a load factor of a CPU 1008 of the CM 901.

Other Embodiments of Control Processing Regarding Exhaustion of Buffer Capacity

Figure 15:
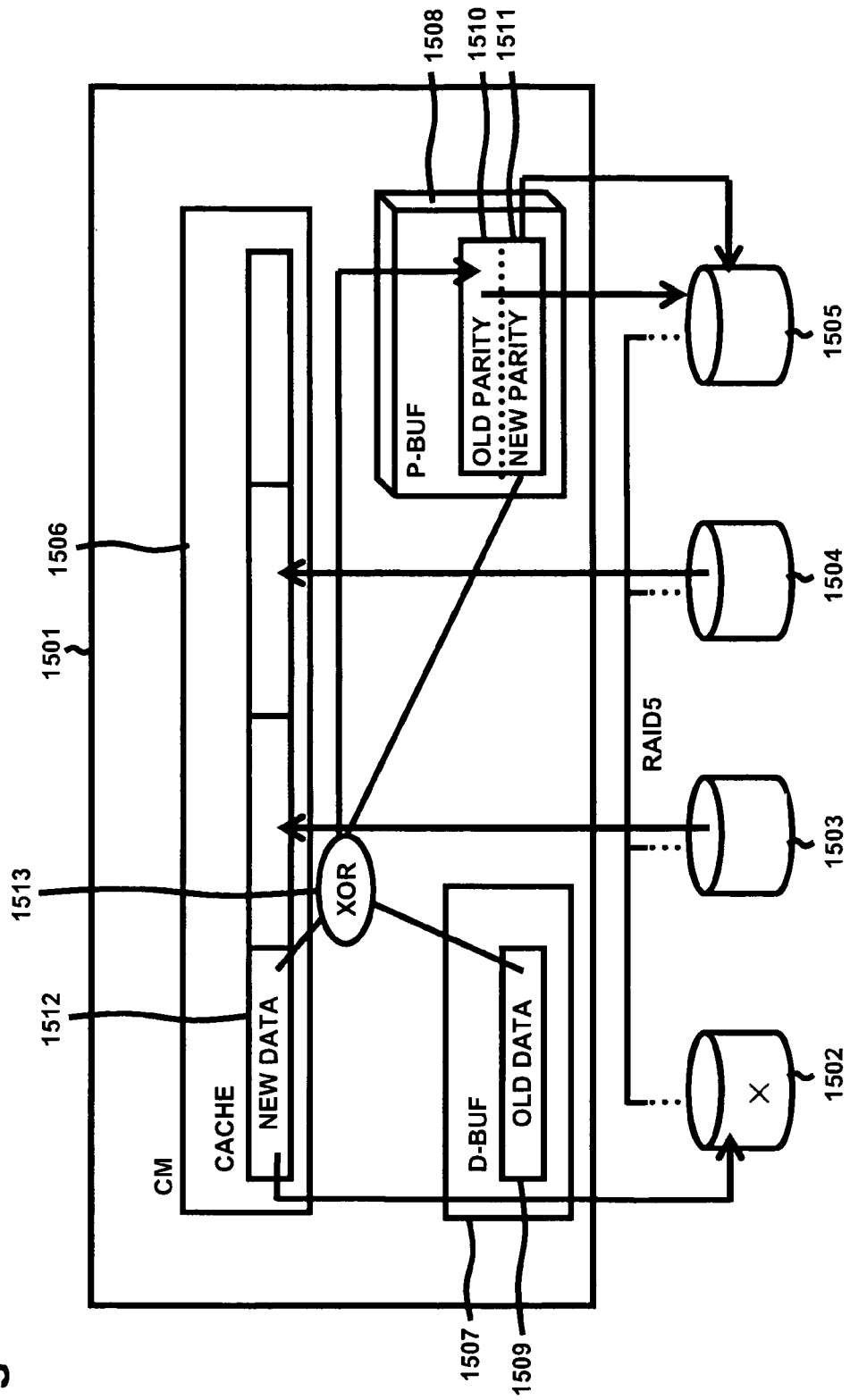
FIG. 15 illustrates control processing regarding exhaustion of a buffer capacity in a RAID system according to another embodiment of the present invention.

Hereinbelow, description is given of other patterns of failure in writing data in the RAID system (RAID 5 configuration). FIG. 15 illustrates control processing regarding exhaustion of a buffer capacity in a RAID system 1500 according to another embodiment of the present invention.

The RAID system 1500 also has the RAID 5 configuration. In FIG. 15, a host computer and a CA (channel adaptor) are not illustrated. This embodiment describes an example where a CM 1501 receives data (New Data) 1512 from the host computer, and fails to write the data (New Data) 1512 to a disk 1502, and a failure occurs in the disk 1502. The CM 1501 succeeds in writing parity data (New Parity) 1511 to a disk 1505. To describe data in the CM 1501 when the CM 1501 fails to write the data (New Data) 1512 to the disk 1502, a cache 1506 stores the data (New Data) 1512, a data buffer 1507 stores data (Old Data) 1509, and a parity buffer 1508 stores parity data (New Parity) 1511.

The CM 1501 operates exclusive OR 1513 between the data (New Data) 1512 and the data (Old Data) 1509 to obtain an intermediate result. In addition, the CM 1501 operates exclusive OR between the intermediate result and the parity data (New Parity) 1511 to obtain parity data (Old Parity) 1510. The CM 1501 writes the parity data (Old Parity) 1510 over the parity buffer 1508. Subsequently, the CM 1501 writes the parity data (Old Parity) 1510 stored in the parity buffer 1508 back to the disk 1505.

Then, the CM 1501 reads the data (Old Data) stored in the disks 1503 and 1504 to the cache 1506. The data (Old Data), which is read from the disks 1503 and 1504 by the CM 1501, has a correspondence relationship with the parity data (Old Parity) 1510 and the data (Old Data) 1509.

The CM 1501 deletes the data (Old Data) 1509 in the data buffer 1507 and in addition, deletes the parity data (Old Parity) 1510 in the parity buffer 1508.

In the CM 1501, the cache 1506 stores the data (New Data) 1512 and the data read from the disks 1503 and 1504, and data consistency is kept on the cache 1506. Thus, the CM 1501 can regenerate the parity data (New Parity) 1511. Therefore, if the disk 1502 is restored, the CM 1501 regenerates the parity data (New Parity) 1511 and tries to write the data (New Data) 1512 to the disk 1502 and write the parity data (New Parity) 1511 to the disk 1505. As a result, exhaustion of capacities of the data buffer 1507 and the parity buffer 1508 can be prevented.

Figure 16:
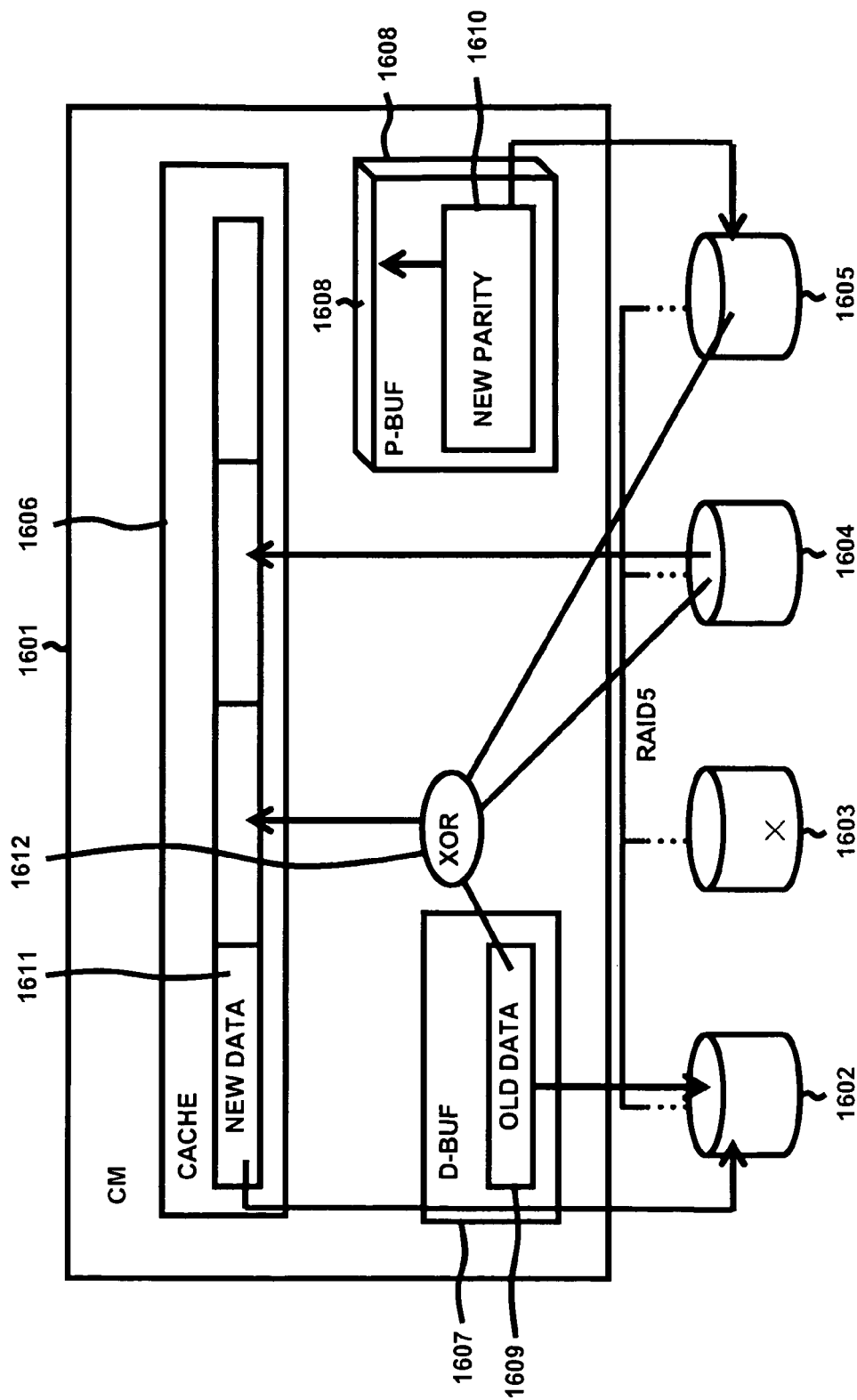
FIG. 16 illustrates control processing regarding exhaustion of a buffer capacity in a RAID system according to another embodiment of the present invention.

FIG. 16 illustrates control processing regarding exhaustion of a buffer capacity in a RAID system 1600 according to another embodiment of the present invention.

The RAID system 1600 also has the RAID 5 configuration. In FIG. 16, a host computer and a CA (channel adaptor) are omitted. This embodiment describes an example where a CM 1601 receives data (New Data) 1611 from the host computer, and fails to write parity data (New Parity) 1610 to a disk 1605, and a failure occurs in a disk 1603. The CM 1601 succeeds in writing data (New Data) 1611 to a disk 1602. To describe data in the CM 1601 when the CM 1601 fails to write the parity data (New Parity) 1610 to the disk 1605, a cache 1606 stores the data (New Data) 1611, a data buffer 1607 stores data (Old Data) 1609, and a parity buffer 1608 stores the parity data (New Parity) 1610.

The CM 1601 writes data (Old Data) 1609 stored in the data buffer 1607 back to the disk 1602. The CM 1601 operates exclusive OR 1612 between the data (Old Data) 1609 and the data (Old Data) stored in the disk 1604 to obtain an intermediate result. In addition, the CM 1601 operates exclusive OR between the intermediate result and the parity data (Old Parity) stored in the disk 1605 to recover the data (Old Data) stored in the disk 1603. The CM 1601 stores the recovered data in the cache 1606. Then, the CM 1601 reads data (Old Data) having a correspondence relationship with the recovered data from the disk 1604.

The CM 1601 deletes the data (Old Data) 1609 in the data buffer 1607 and further deletes the parity data (New Parity) 1610 in the parity buffer 1608.

In the CM 1601, the cache 1606 stores the data (New Data) 1611, the data read from the disk 1604, and the data stored in the disk 1603 and recovered with the CM 1601, data consistency is kept on the cache 1606. Thus, the CM 1601 can regenerate the parity data (New Parity) 1610. Therefore, when the disk 1603 is restored, the CM 1601 regenerates the parity data (New Parity) 1610 and tries to write the data (New Data) 1611 to the disk 1602 and write the parity data (New Parity) 1610 to the disk 1605. As a result, exhaustion of capacities of the data buffer 1607 and the parity buffer 1608 can be prevented.

What is claimed is:

1. A method for controlling a controller connected to a plurality of storage units storing data, the controller including a cache, a data buffer, and a parity buffer, the method comprising:

storing updated data to be written into a first storage unit in the cache, the plurality of storage units including the first storage unit and a second storage unit;

reading old data related to the updated data from the first storage unit and storing the read old data in the data buffer;

generating updated parity data corresponding to the updated data stored in the cache and storing the updated parity data in the parity buffer;

writing the updated data stored in the cache into the first storage unit and the updated parity data stored in the parity buffer into the second storage unit;

comparing the updated parity data stored in the parity buffer with the updated parity data written into and read out from the second storage unit;

writing the old data stored in the data buffer back to the first storage unit so as to maintain consistency between data in the plurality of storage units when the updated parity data stored in the parity buffer is different from the updated parity data read out from the second storage unit;

deleting the updated parity data from the parity buffer; and regenerating updated parity data by using the updated data stored in the cache and rewriting the regenerated updated parity data into the second storage unit.

2. The method according to claim 1, further comprising:

reading, when the updated parity data stored in the parity buffer is different from the updated parity data read out from the second storage unit, associated data used for regenerating the updated parity data from the plurality of storage units and storing the read associated data in the cache so as to form a stripe with the updated data and the associated data, wherein the regenerating includes regenerating the updated parity data by using the stripe stored in the cache.

3. The method according to claim 2, wherein the updated parity data is regenerated by using the stripe stored in the cache upon executing a command retry for rewriting the updated parity data into the second storage unit.

4. The method according to claim 1, wherein the updated parity data is regenerated in accordance with a load applied to the controller.

5. The method according to claim 1, further comprising:

reading old parity data related to the old data from the second storage unit;

recovering associated data by using the old data and the old parity data, the associated data being used for regenerating the updated parity data; and storing the recovered associated data in the cache so as to form a stripe with the updated data and the associated data, wherein the regenerating includes regenerating the updated parity data by using the stripe stored in the cache.

6. An apparatus comprising:
a plurality of storage units for storing data, the plurality of storage units including a first storage unit and a second storage unit;
a cache for storing data;
a data buffer for storing the data;
a parity buffer for storing parity data corresponding to the data; and
a control unit for writing updated data and updated parity data into the plurality of the storage units in accordance with a process comprising:
reading old data related to the updated data from the first storage unit and storing the read old data in the data buffer;
writing the updated data into the first storage unit and the updated parity data into the second storage unit;
comparing the updated parity data stored in the parity buffer with the updated parity data written into and read out from the second storage unit;
writing the old data stored in the data buffer back to the first storage unit so as to maintain consistency between data in the plurality of storage units when the updated parity data stored in the parity buffer is different from the updated parity data read out from the second storage unit;
deleting the updated parity data from the parity buffer; and
regenerating updated parity data by using the updated data stored in the cache and rewriting the regenerated updated parity data into the second storage unit.

7. The apparatus according to claim 6, wherein the process further comprises:
reading, when the updated parity data stored in the parity buffer is different from the updated parity data read out from the second storage unit, associated data used for regenerating the updated parity data from the plurality of storage units and storing the read associated data in the cache so as to form a stripe with the updated data and the associated data,
wherein the regenerating includes regenerating the updated parity data by using the stripe stored in the cache.

8. The apparatus according to claim 6, wherein the process further comprises:
reading old parity data related to the old data from the second storage unit;
recovering associated data by using the old data and the old parity data, the associated data being used for regenerating the updated parity data; and
storing the recovered associated data in the cache so as to form a stripe with the updated data and the associated data,
wherein the regenerating includes regenerating the updated parity data by using the stripe stored in the cache.

* * * * *